United States Patent
Wang

(10) Patent No.: US 8,612,736 B2
(45) Date of Patent: Dec. 17, 2013

(54) CONTROL APPARATUS AND METHOD FOR POWERING ON A COMPUTER

(75) Inventor: Hsin-Fu Wang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 366 days.

(21) Appl. No.: 12/981,510

(22) Filed: Dec. 30, 2010

(65) Prior Publication Data

US 2012/0054505 A1     Mar. 1, 2012

(30) Foreign Application Priority Data

Aug. 31, 2010  (TW) ............................. 99129377 A

(51) Int. Cl.
*G06F 9/00*  (2006.01)
*G06F 1/00*  (2006.01)
*G06F 1/26*  (2006.01)
*G06F 11/00*  (2006.01)

(52) U.S. Cl.
USPC .................. 713/2; 713/1; 713/100; 713/300; 714/3; 714/100

(58) Field of Classification Search
None
See application file for complete search history.

(56) References Cited

U.S. PATENT DOCUMENTS

| | | | |
|---|---|---|---|
| 7,350,090 B2 * | 3/2008 | Baurer et al. ................. | 713/300 |
| 7,987,377 B2 * | 7/2011 | Fu ................................. | 713/310 |
| 2004/0207440 A1 * | 10/2004 | Robertson et al. ............ | 327/291 |
| 2010/0095138 A1 * | 4/2010 | Huang et al. .................. | 713/300 |
| 2011/0231639 A1 * | 9/2011 | Chien ............................. | 713/2 |

* cited by examiner

*Primary Examiner* — Ji H Bae
(74) *Attorney, Agent, or Firm* — Altis Law Group, Inc.

(57) ABSTRACT

A control apparatus includes a power supply unit, a power on unit, a control chip, a baseboard management controller (BMC) chip, and a south bridge. The power on unit sends a first power on signal to the control chip. The control chip receives the first power on signal and sends a triggering signal to the BMC chip. The south bridge is connected to the control chip and the BMC chip. The south bridge is driven to control the power supply unit to power on the computer by the control chip or the BMC chip according to states of the BMC chip after a predetermined time. If the BMC chip is in a start mode, the control chip drives the south bridge; if the BMC chip is in a working mode, the BMC chip receives the triggering signal and drives the south bridge.

12 Claims, 3 Drawing Sheets

CONTROL APPARATUS AND METHOD FOR POWERING ON A COMPUTER

BACKGROUND

1. Technical Field

The disclosure generally relates to control apparatuses, and particularly to a control apparatus used to power on a computer.

2. Description of Related Art

Intelligent platform management interfaces (IPMI) are widely applied in computer to monitors characteristics of a computer, such as temperatures, voltages, power supplies, and fan speeds. A Baseboard Management controller (BMC) is a core feature of the IPMI. When the computer is powered on, the BMC automatically enters into a start mode. However, the BMC may still be in the start mode even the computer system has been operating. Because the BMC cannot monitor the characteristics of the computer unless it is in a working mode, the computer maybe running in an unstable state.

Therefore, there is room for improvement within the art.

BRIEF DESCRIPTION OF THE DRAWINGS

Many aspects of the control apparatus for powering on a computer can be better understood with reference to the following drawings. The components in the drawings are not necessarily drawn to scale, the emphasis instead being placed upon clearly illustrating the principles of the control apparatus for powering on a computer.

DETAILED DESCRIPTION

Figure 1:
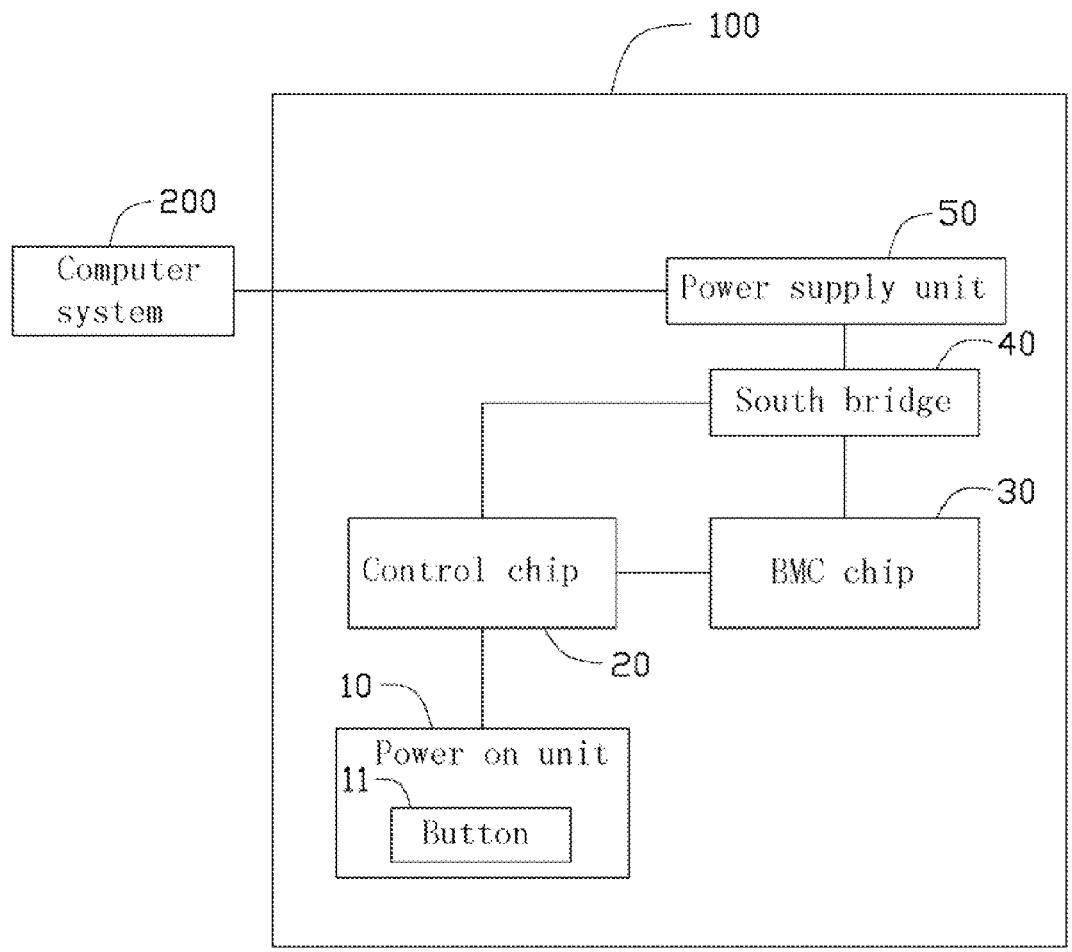
FIG. 1 is a block diagram of a control apparatus for powering on a computer, according to a first exemplary embodiment.

FIG. 1 shows a control apparatus 100 used to power on a computer system 200 according to a first exemplary embodiment. The computer system 200 includes a power on unit 10, a control chip 20, a BMC chip 30, a south bridge 40, and a power supply unit 50. The power on unit 10, the control chip 20, the south bridge 40, and the power supply unit 50 are connected in series. The BMC chip 30 is connected to the control chip 20 and the south bridge 40.

The power on unit 10 includes a button 11. When the button 11 is pressed, the power on unit 10 sends a first power on signal to the control chip 20.

The control chip 20 receives the first power on signal from the power on unit 10 and sends a triggering signal to drive the BMC chip 30. The control chip 20 also sends a second power on signal to the south bridge 40 according to the states of the BMC chip 30 after a predetermined time.

The BMC chip 30 includes a start mode and a working mode. In the start mode, the BMC chip 30 executes starting programs stored therein and initializes itself. In the working mode, the BMC chip 30 monitors characteristics of the computer system 200, such as temperatures, voltages, power supplies, and fan speeds. The BMC chip 30 automatically enters into the start mode when a system power supply such as the power supply unit 50 is provided to the BMC chip 30. If the BMC chip 30 can work normally, it enters into the working mode from the starting mode after the starting time and receives the triggering signal from the control chip 20. If the BMC chip 30 works abnormally, it cannot enter into the working mode from the start mode after the starting time and cannot receive the triggering signal from the control chip 20. The starting time is equal to or shorter than the predetermined time to ensure that the BMC chip has enough time to enter into the working mode before the predetermined time ends. In addition, when the BMC chip 30 normally enters into the working mode from the starting mode and receives the triggering signal from the control chip 20, the BMC chip 30 sends a feed back signal to indicate the control chip 20 and also sends a second power on signal to the south bridge 40.

The south bridge 40 controls the power supply 70 to power on the computer system 200 when the south bridge 40 receives the second power on signal from the control ship 20 or the BMC chip 30.

Figure 2:
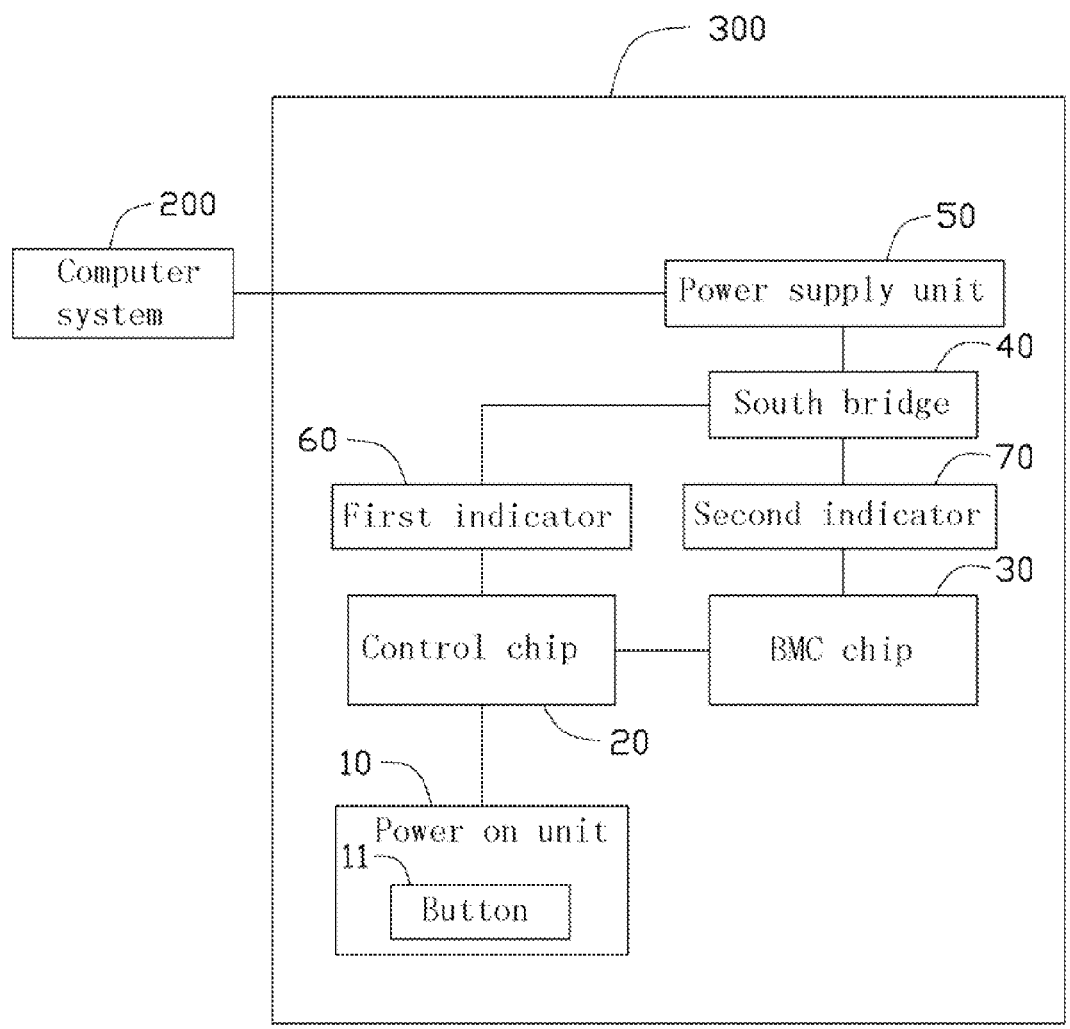
FIG. 2 is a block diagram of a control apparatus for powering on a computer, according to a second exemplary embodiment.

Referring to FIG. 2, in the second exemplary embodiment, a control apparatus 300 is substantially similar to the control apparatus 100 but further includes a first indicator 60 and a second indicator 70. The first indicator 60 is set between the control chip 20 and the south bridge 40 to indicate whether the control chip 20 sends the second power on signal to the south bridge 40. The second indicator 70 is set between the BMC chip 30 and the south bridge 40 to indicate whether the BMC chip 30 sends the second power on signal to the south bridge 40.

Figure 3:
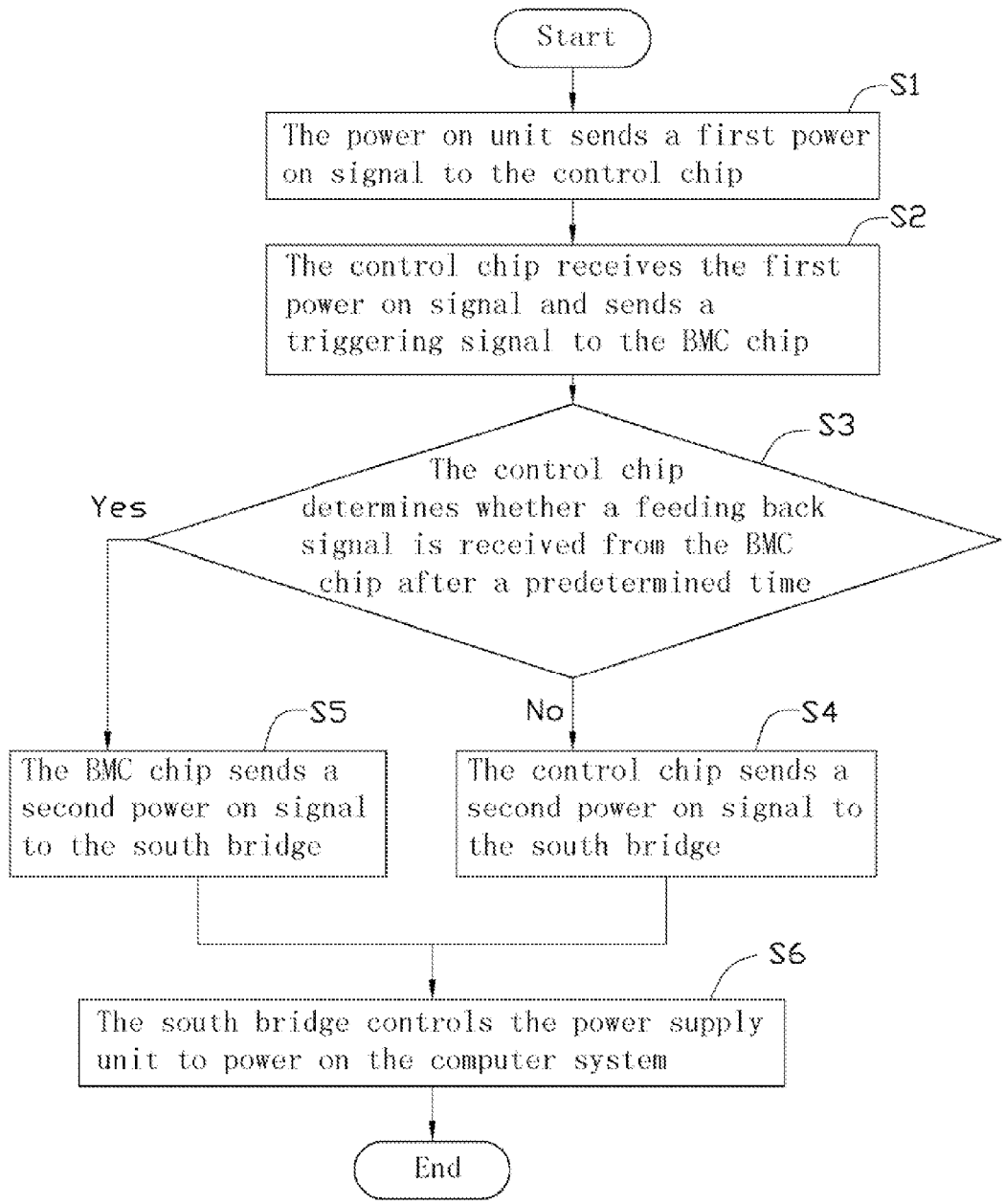
FIG. 3 is a flowchart of a control process of powering on a computer with the control apparatus of FIG. 1.

Referring to FIG. 3, the control process of the control apparatus 100 works may include following steps:

In step S1, the power on unit 10 is pressed to send a first power on signal to the control chip 20.

In step S2, the control chip 20 receives the first power on signal from the control chip 20, and sends a triggering signal to the BMC chip 30.

In step S3, the control chip 20 determines whether a feed back signal is received from the BMC chip 30 after a predetermined time. If the control chip 20 receives a feed back signal from the BMC chip 30 after the predetermined time and the BMC chip 30 enters into the working mode, which monitors working states of the computer system 200, the process goes to step S5. If the control chip 20 does not receive a feed back signal from the BMC chip 30 during the predetermined time, the BMC chip 30 works abnormally and can not enter into the working mode from the starting mode, the process goes to step S4.

In step S4, the control chip 20 sends a second power on signal to the south bridge 40.

In step S5, the BMC chip 30 sends a second power on signal to the south bridge 40.

In step S6, the south bridge 40 receives the second power on signal from the BMC chip 30 or the control chip 20 and controls the power supply unit 50 to power on the computer system 200.

The control apparatus 100 can select the control chip 20 or the BMC chip 30 to drive the south bridge 40 according to the states of the BMC chip 30. When the control chip 20 after the predetermined time, drives the south bridge 40, the BMC chip 30 has enough time to enter into the working mode, which effectively avoids that the computer system 200 is powered on before the BMC chip 30 enters into the working mode. In addition, when the BMC chip 30 cannot work normally, the control chip 20 can power on the computer system 200.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A control apparatus for powering on a computer system, the control apparatus comprising:
   a power supply unit;
   a power on unit to send a first power on signal;
   a control chip connected to the power on unit, the control chip receiving the first power on signal and sending a triggering signal; and
   a BMC chip connected to the control chip; and
   a south bridge connected to the control chip and the BMC chip; wherein the south bridge is driven to control the power supply unit to power on the computer by the control chip or the BMC chip according to modes of the BMC chip after a predetermined time; wherein the control chip is configured to drive the south bridge in a start mode of the BMC chip; and wherein the BMC chip is configured to receive the triggering signal and drive the south bridge in a working mode of the BMC chip.

2. The control apparatus as claimed in claim 1, wherein when the BMC chip works normally, the BMC chip is configured to enter into the working mode after a starting time, and wherein the predetermined time is not shorter than the starting time.

3. The control apparatus as claimed in claim 2, wherein when the BMC chip enters into the working mode, the BMC chip is configured to send a feed back signal to the control chip, and the control chip is configured to determine the mode of the BMC chip after the predetermined time according to the feed back signal.

4. The control apparatus as claimed in claim 3, wherein when the BMC chip enters into the working mode, the BMC chip is configured to send a second power on signal to the south bridge.

5. The control apparatus as claimed in claim 3, wherein the control chip is configured to send a second power on signal to the south bridge if the control chip does not receive the feed back signal from the BMC chip during the predetermined time.

6. The control apparatus as claimed in claim 5, further including an indicator set between the control chip and the south bridge, the indicator configured to indicate whether the control chip sends the second power on signal to the south bridge.

7. The control apparatus as claimed in claim 4, further including an indicator set between the BMC chip and the south bridge, the indicator configured to indicate whether the BMC chip sends the second power on signal to the south bridge.

8. A method for powering on a computer, comprising:
   providing a control apparatus including a power on unit, a control chip, a BMC chip, a south bridge and a power supply unit;
   sending a first power on signal to the control chip from the power on unit;
   sending a triggering signal to the BMC chip from the control chip;
   sending a second power on signal to the south bridge from the control chip or the BMC chip according to modes of the BMC chip after a predetermined time; and
   driving the south bridge to control the power supply unit to power on the computer by the second power on signal.

9. The method as claimed in claim 8, wherein the BMC chip includes a start mode and a working mode, and further wherein if the BMC chip normally works, the BMC chip receives the triggering signal from the control chip and enters into the working mode after a starting time, the predetermined time is not shorter than the starting time.

10. The method as claimed in claim 9, wherein when the BMC chip is in the start mode after the predetermined time, the second power on signal is sent by the control chip.

11. The method as claimed in claim 9, wherein when the BMC chip is in the working mode after the predetermined time, the second power on signal is sent by the BMC chip.

12. The method as claimed in claim 9, wherein when the BMC chip enters into the working mode, the BMC chip sends a feed back signal to the control chip, and the control chip determines the state mode of the BMC chip after the predetermined time according to the feed back signal.

* * * * *